(No Model.)
R. S. WARING.
METHOD OF DIVIDING AND BRANCHING ELECTRIC CABLES.
No. 268,324. Patented Nov. 28, 1882.
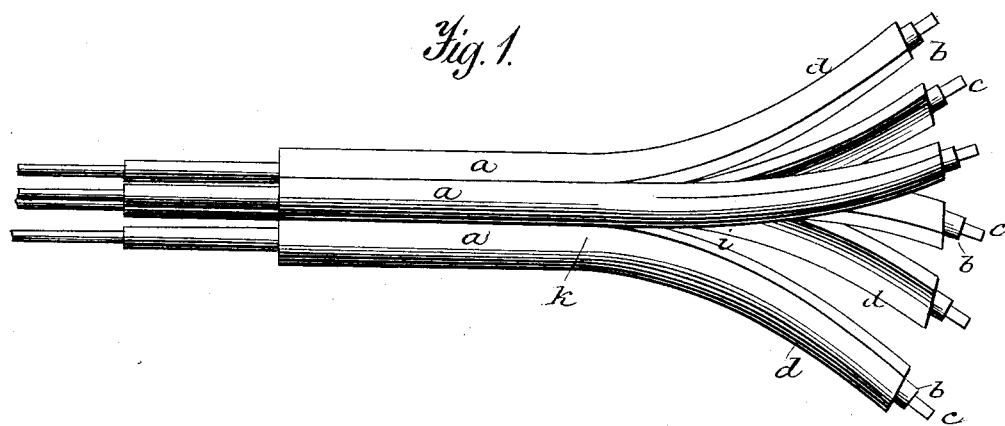
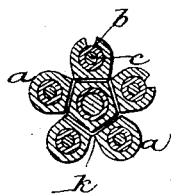
Witnesses.
A. Ruppert.
Eugene D'Carusi.
Inventor:
Richard S. Waring
per O. E. Duffy
Att'y.

UNITED STATES PATENT OFFICE.

RICHARD S. WARING, OF PITTSBURG, PENNSYLVANIA.

METHOD OF DIVIDING AND BRANCHING ELECTRIC CABLES.

SPECIFICATION forming part of Letters Patent No. 268,324, dated November 28, 1882.

Application filed September 22, 1882. (No model.)

*To all whom it may concern:*

Be it known that I, RICHARD S. WARING, of Pittsburg, in the county of Allegheny and State of Pennsylvania, have invented certain new and useful Improvements in Method of Dividing and Branching Electric Cables; and I do hereby declare that the following is a full, clear, and exact description of the invention, which will enable others skilled in the art to which it appertains to make and use the same, reference being had to the accompanying drawings, and to the letters of reference marked thereon, which form part of this specification.

This invention relates to certain improvements in that class of cables for the transmission of electric currents which are composed of an armor of lead or other ductile metal, the said armor being grooved longitudinally, forming longitudinal ribs which have insulated wires or conductors extending through them, the tube being provided with a central conductor, if desired, the invention being an improvement upon an invention for which I made application for Letters Patent of the United States on the 21st day of September, 1882, which is now pending in the Patent Office, (Serial No. 72,361.)

My invention consists in forming branches of the inclosed wires and inclosing-tubes by cutting them longitudinally down through the metal inclosing the wires between said wires, and down the grooves, so as to form a series of independent metal-covered branches, which may be turned outward laterally, as and for the purpose more fully hereinafter specified.

In the drawings, Figure 1 represents a side elevation of a section of a cable, showing all of the insulating-wires with their lead arming divided and branched, and Fig. 2 represents a cross-section of the cable, showing the divided arming ready to be branched.

The cable is constructed of an armor of lead or other ductile material provided with a series of longitudinal ribs, $a$, through which extend the wires or conductors $c$, surrounded with insulating material $b$. The grooves K between the ribs may be of any desired depth or shape, and the armor may be provided with a central longitudinal passage, which may be corrugated or plain, for a group of insulated wires or a single heavy wire to form a conductor sufficiently large to convey the strong currents necessary for electric motors or the production of the electric light, or other like purposes.

In order to form branches at the ends of the cable, or any section thereof, the ductile material is cut down longitudinally, as indicated by the letter $i$, following the line of the grooves, so as to divide the cable into a series of independent metal-covered or armed insulated conductors $d$, which may be branched by spreading them apart laterally, as indicated. The branches as thus formed, it is evident, may be connected with independent conductors in any direction as may be desired.

Having thus fully described my invention, what I claim as new, and desire to secure by Letters Patent, is—

The method of forming branches in a cable having a series of insulated conductors inclosed in an armor of ductile material, the same consisting in cutting the ductile material longitudinally between the conductors and bending the separated parts laterally, forming a series of independent metal-armed and insulated conductors, substantially as specified.

In testimony that I claim the foregoing as my own I affix my signature in presence of two witnesses.

RICHARD S. WARING.

Witnesses:
J. S. KIRK,
E. S. THOMAS.